United States Patent
van Pinxteren et al.

(10) Patent No.: US 6,452,118 B1
(45) Date of Patent: Sep. 17, 2002

(54) WEIGHING APPARATUS

(75) Inventors: Ad van Pinxteren, Eemnes; Brand van de Hazel, Putten; Willem van Veldhuisen, Lunteren, all of (NL)

(73) Assignee: FPS Food Processing Systems B.V. (NL)

( * ) Notice: Subject to any disclaimer, the term of this patent is extended or adjusted under 35 U.S.C. 154(b) by 0 days.

(21) Appl. No.: 09/646,048

(22) PCT Filed: Mar. 12, 1999

(86) PCT No.: PCT/NL99/00137

§ 371 (c)(1),
(2), (4) Date: Nov. 20, 2000

(87) PCT Pub. No.: WO99/46568

PCT Pub. Date: Sep. 16, 1999

(30) Foreign Application Priority Data

Mar. 13, 1998 (NL) ................................................ 108590

(51) Int. Cl.$^7$ .......................... G01G 19/00; A01K 43/08
(52) U.S. Cl. ........................ 177/145; 209/512; 209/912
(58) Field of Search ........................ 177/145; 209/912, 209/512, 592

(56) References Cited

U.S. PATENT DOCUMENTS

| | | | | |
|---|---|---|---|---|
| 4,187,945 A | * | 2/1980 | Altenpohl et al. | 209/592 |
| 4,478,302 A | * | 10/1984 | Niederer et al. | 177/145 |
| 4,488,635 A | * | 12/1984 | Linville | 177/145 |
| 4,770,260 A | * | 9/1988 | Brook | 177/145 |
| 5,037,351 A | * | 8/1991 | van Den Nieuwelaar et al. | 209/592 |
| 5,306,877 A | * | 4/1994 | Tas | 177/145 |
| 6,073,667 A | * | 6/2000 | Graffin | 177/145 |

* cited by examiner

Primary Examiner—Randy W. Gibson
(74) Attorney, Agent, or Firm—Larson & Taylor, PLC (57) ABSTRACT

A weighing apparatus comprising a number of grippers each designed for receiving therein an object to be weighed, each gripper being mounted on a conveyor via a hingeless connection, so that the grippers are arranged for movement along a gripper path, each gripper comprising a first guide element which, over at least a part of the gripper path, moves over a weighing surface of at least one weighing element, the weight of the gripper and the object located therein being transferred vis the first guide element to the at least one weighing element, the hingeless connection between each gripper and the conveyor comprising at least one assembly of flexible members each having a particularly low spring constant in a direction perpendicular to the at least one weighing sruface.

14 Claims, 10 Drawing Sheets

WEIGHING APPARATUS

This invention relates to a weighing apparatus comprising a number of grippers each designed for receiving therein an object to be weighed, each gripper being mounted on a conveyor via a connection, so that the grippers are arranged for movement along a gripper path, each gripper comprising a first guide element which, over at least a part of the gripper path, moves over a weighing surface of at least one weighing element, whereby the weight of the gripper and the object located therein is transferred via the first guide element to the at least one weighing element.

Such an apparatus is known from U.S. Pat. No. 5,703,332. The drawback of this known apparatus is that the connection between each gripper and the conveyor is formed by an assembly of at least two parallel rods which, on one side, are each connected with the gripper through a hinge and, on the other, are each connected with the conveyor through a hinge. For the purpose for which the known apparatus is intended, viz. weighing fruits such as apples, paprikas and the like, the accuracy of the known apparatus is sufficient. For some applications, however, a higher accuracy is required. In particular, a higher accuracy is required for weighing eggs with greater accuracy. In the known apparatus, a weighing error of ±1.5 grams must be taken into account. The invention contemplates a weighing apparatus in which a weighing error of about ±0.2 grams at a maximum occurs. The weighing error in the known apparatus is caused in particular by the friction in the hinges of the parallel rods. Further, the path followed by the conveyor, and hence the paths followed by the grippers, is not defined very accurately, owing to play and dimensional variations in the conveyor. As a consequence of the above-mentioned inaccuracy of the path followed by the conveyor, it happens regularly that the parallel rods do not assume a horizontal position when the first guide element moves over the weighing surface of the weighing element. Consequently, the force exerted by the conveyor on the gripper for the purpose of conveyance will result in a vertical force component, which is taken up by the weighing element, so that the measurement is undesirably influenced.

The invention contemplates a weighing apparatus of the type described above without the above-described disadvantages, that is, an apparatus capable of performing a highly accurate weighing while the objects are being conveyed.

To that end, according to the invention, the apparatus of the type mentioned in the preamble is characterized in that the connection between each gripper and the conveyor comprises at least one assembly of flexible members each having a particularly low spring constant in a direction perpendicular to the at least one weighing surface.

Because the connection between the conveyor and the gripper is formed by at least one assembly of flexible members each having a particularly low spring constant in a direction perpendicular to the at least one weighing surface—a spring constant of less than about 0.1 Nmm can be considered here—the connection can be made of hingeless design. As a consequence of this hingeless connection, the weighing cannot sustain any influence from frictional forces arising in hinges, such as occur in the weighing apparatus according to the prior art. As a consequence of the absence of hinges and frictional forces arising therein, a particularly accurate weighing can be realized, an accuracy of about +0.1 gram being feasible.

Preferably, the first guide element and the or each weighing element are arranged above an object received in the gripper in question. This prevents dirt transported along with the object from ending up on the weighing element or the guide element.

A first embodiment of the weighing apparatus according to the invention is characterized by one assembly of flexible members arranged relative to the first guide element such that these members, at least when the first guide element moves over a said weighing surface, are all subject to tensile loading. In practice, the assembly of flexible members is designed as three flexible strips or leaf springs which are arranged in a triangle configuration, with the guide element disposed within this triangle, so that when the guide element sustains a frictional force in that it moves over the weighing surface, all three strips are subject to pull. As a consequence of such a design, the gripper maintains a stable position also during weighing.

A second embodiment of the weighing apparatus according to the invention is characterized by a second guide element and a reference guide over which the second guide element moves, at least when the first guide element moves over a said weighing surface, while a connection point between the conveyor and at least that flexible member that is located closest to the first guide element is displaceable in a direction perpendicular to the at least one weighing surface, the position of the displaceable connection point being controlled by cooperation of the second guide element and the reference guide, such that at least the or each flexible member provided with a displaceable connection point extends substantially parallel to the at least one weighing surface when the first guide element moves over a said weighing surface.

As a result of the fact that at least the flexible member that is located closest to the first guide element extends parallel to the weighing surface during weighing, that flexible member which is subject to the most tensile force will not transmit any vertical force component onto the weighing surface. Displacement of the gripper under the influence of play and dimensional inaccuracy in the transport system in a direction perpendicular to the weighing surface does not have any influence on the weighing, due to the displaceably arranged connection point, so that a very high weighing accuracy can be accomplished.

A third embodiment of the weighing apparatus according to the invention is characterized in that the connection between each gripper and the conveyor comprises a first and a second assembly of members, the weighing apparatus comprising a second guide element and a reference guide over which the second guide element moves, at least when the first guide element moves over a said weighing surface, the first assembly forming a connection between the second guide element and the conveyor, the second assembly forming a connection between the second guide element and the gripper, the members of the second assembly being flexible members each having a particularly low spring constant in a direction perpendicular to the weighing surface, the first and the second guide element and the at least one weighing surface and the reference guide being arranged relative to each other such that the flexible members of the second assembly extend substantially parallel to the at least one weighing surface when the first guide element moves over a said weighing surface.

In a weighing apparatus of such design, too, the conveyor does not exert any vertical force component of the conveying force on the weighing surface, in that the flexible members of the second assembly extend substantially parallel to the weighing surface. The weighing apparatus according to the third embodiment therefore has a particularly high accuracy. The members of the first assembly can be designed as flexible members. In an alternative further elaboration, the members of the second assembly can be designed as rods having their ends pivotally connected to the conveyor on the one hand and an intermediate piece carrying the second guide element.

Further elaborations of the invention are described below and will be further clarified hereinafter on the basis of three exemplary embodiments, with reference to the drawings.

It is noted that U.S. Pat. No. 3,980,147 discloses a weighing apparatus which comprises an assembly of flexible members. However, this is not a weighing apparatus which involves weighing of the objects while they are being conveyed. The problems for which the invention provides the solution, that is, minimizing the influence of conveying forces on weighing, does not play any role in the apparatus known from the above identified U.S. patent.

All embodiments shown relate to a weighing apparatus comprising a number of grippers 1, each adapted for receiving therein an object E to be weighed, such as, for instance, an egg. The grippers 1 are mounted on crossbars 2 of an endless conveyor via a connection. The crossbars 2 have their ends connected to chains or like endless elements each tensioned around a return wheel and a driving wheel. Generally, on each crossbar 2, a plurality of grippers are mounted side by side, so that the conveyor is provided with a number of rows of grippers 1, which rows extend in the direction of transport. The grippers 1 are moved along a gripper path by the conveyor. To secure the gripper 1 on the crossbars 2 of the conveyor, for each gripper a carrier member 3, 23 or 38 is mounted on the crossbars.

Figure 1:
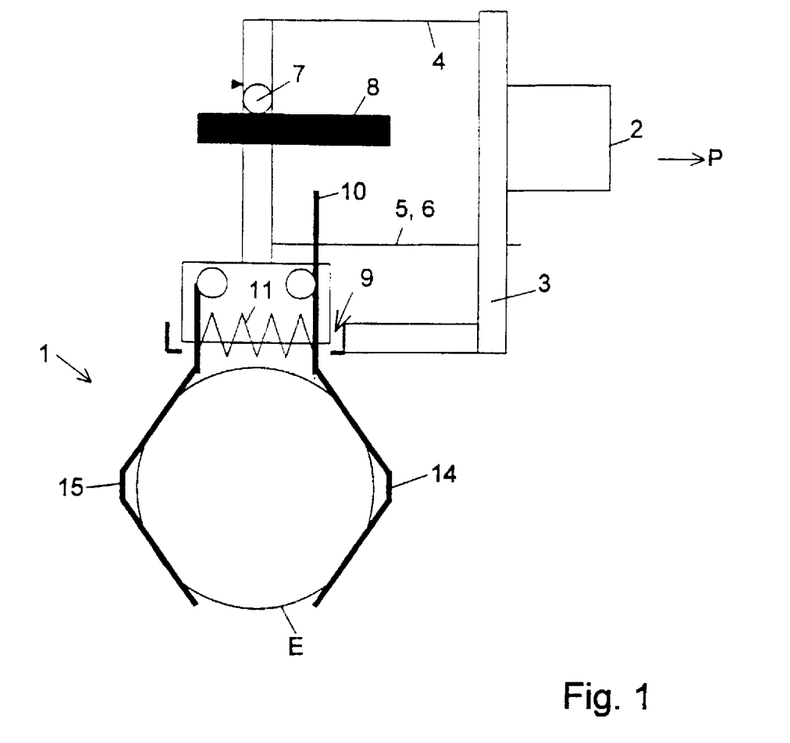
FIG. 1 shows a schematic outline of a portion of a first embodiment of the apparatus.
Figure 2:
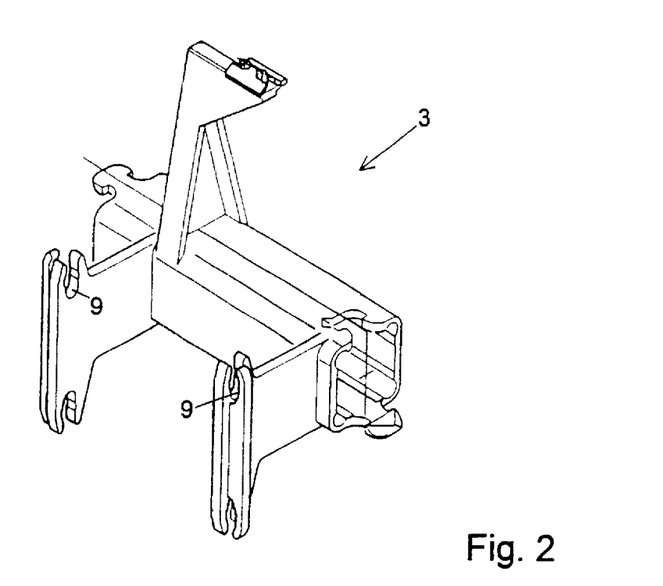
FIG. 2 shows a carrier member of the first embodiment.

The carrier member belonging to the first embodiment of the weighing apparatus according to the invention is shown in perspective in FIG. 2. The gripper 1 is connected with the carrier member 3 via a connection. In the first embodiment, represented in FIGS. 1, 5 and 6, this connection is formed by an assembly of flexible members 4, 5, 6. The gripper 1 further comprises a guide element 7 which, over at least a part of the gripper path, moves over a weighing surface 8 of at least one weighing element. When the first guide element 7 does not move over a weighing surface, the gripper 1 rests in a socket 9 of the carrier member 3. Each gripper 1 is fitted with an operating lever 10 and spring means 11. The spring means are biased for keeping the gripper 1 in a closed position. Using the operating lever 10, the gripper 1 can be opened against the spring force of the spring means 11. The socket 9 in which the gripper 1 rests when no weighing is taking place is designed so as to take up the reactive forces arising upon operation of the operating lever 10. The gripper 1 comprises a body portion 12, a hinge pin assembly 13 and two gripper blades 14, 15, whose angular position is coupled through two gear segments 14a, 15a. The pin assembly 13 comprises two pins 16, 17 on which the gripper halves 15 and 14, respectively, are pivotally mounted. The pin assembly 13 and the body 12 are each provided with two projections 18, 19, which fall into the socket 9 of the carrier member 3 and with which the vertical freedom of movement of the gripper 1 is limited.

Figure 5:
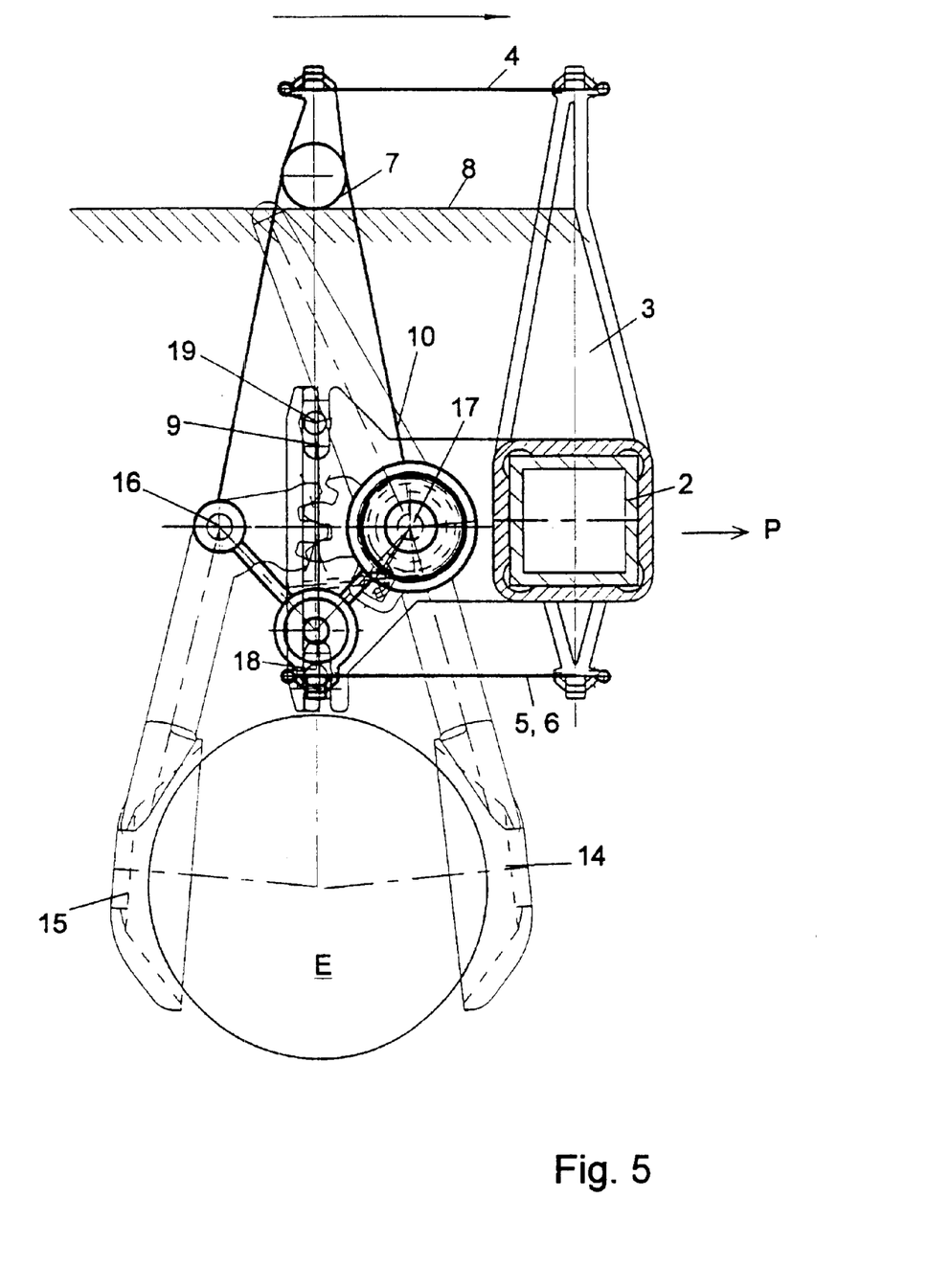
FIG. 5 shows a side view of a portion of the first embodiment in assembled condition.
Figure 6:
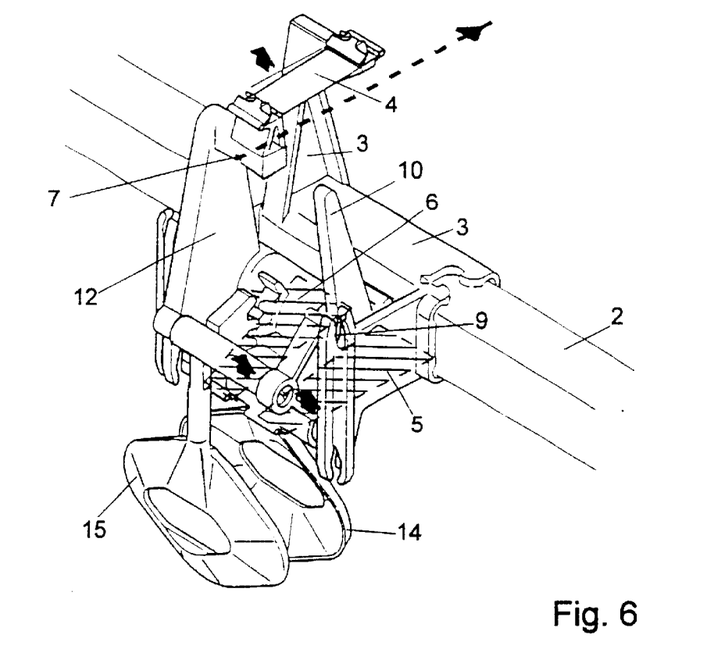
FIG. 6 shows a perspective view of a portion of the first embodiment.

Upon drive of the conveyor, the crossbars 2 move in the direction of the arrow P. When the first guide element 7 moves over the weighing surface 8, the gripper 1 is lifted from the socket 9, so that the weight of the gripper 1 and the object E disposed therein rests on the weighing surface 8. The connection between the carrier member 3 and the gripper 1 is formed by the flexible members 4, 5, 6, which may be designed as flexible strips having a particularly high flexibility, such as, for instance, a plastic film strip. The flexible members may also be designed as leaf springs having a very high flexibility. When the first guide element 7 has been moved off the weighing surface 8 and no weighing takes place, the gripper 1 has the projections 18, 19 resting in the socket 9. At that moment, there is a stable connection between the gripper 1 and the crossbars 2 of the conveyor via the carrier member 3.

Figure 7:
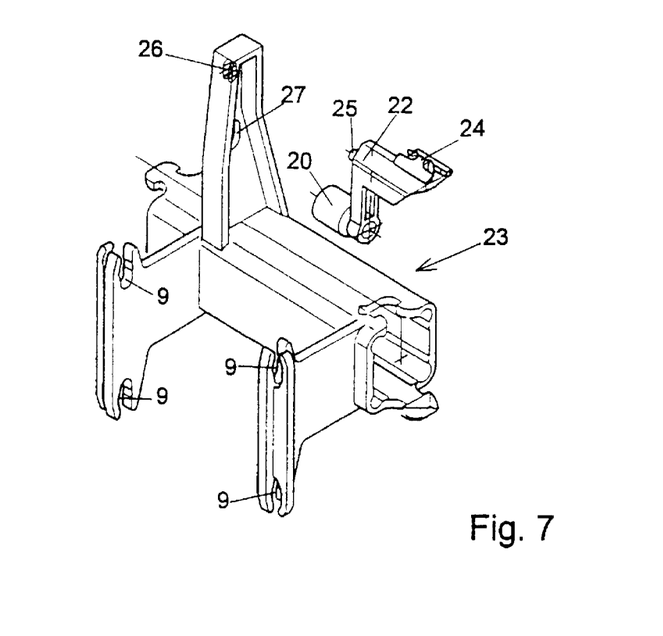
FIG. 7 shows a carrier member of a second embodiment of the apparatus.
Figure 8:
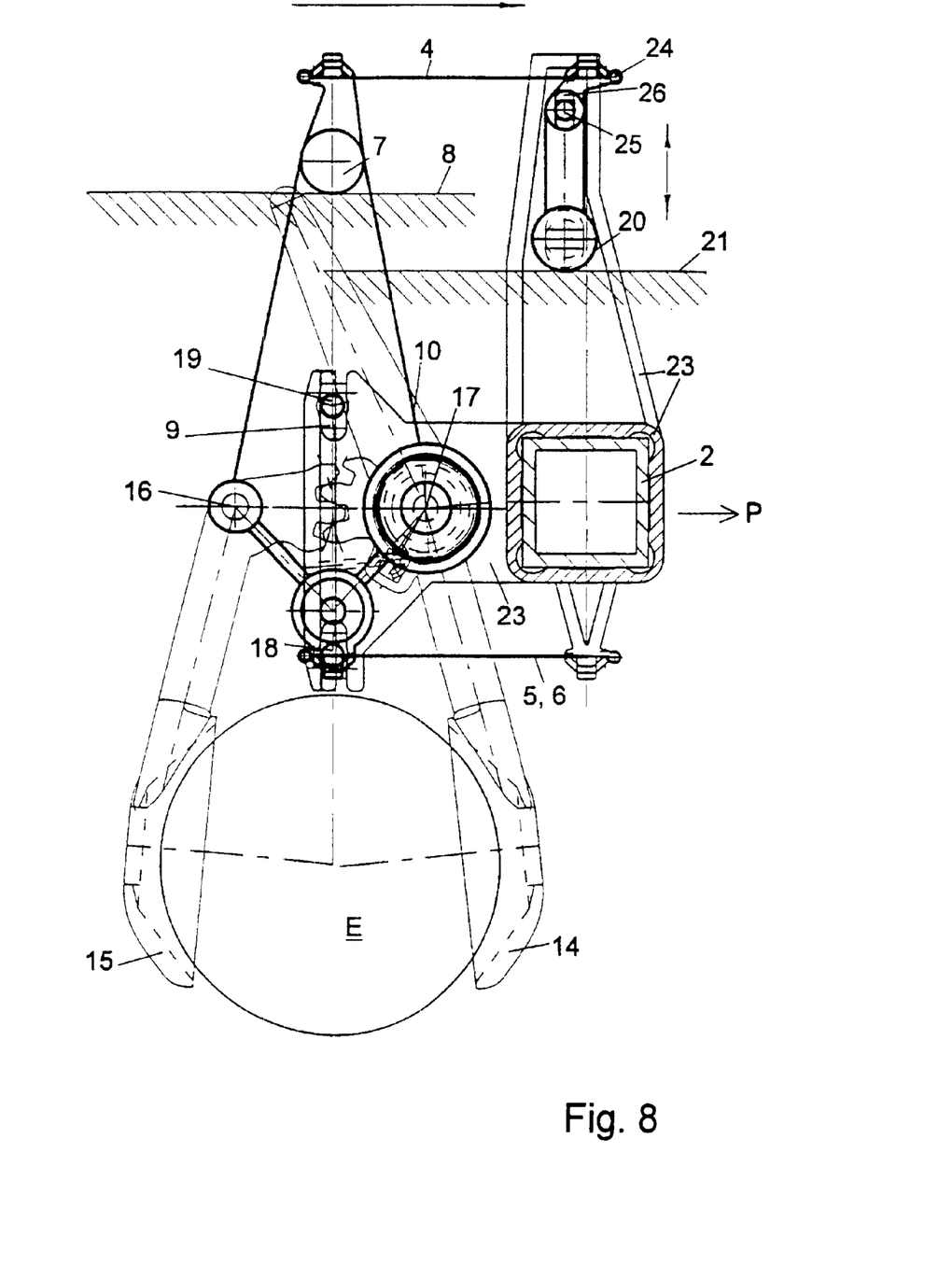
FIG. 8 shows a side view of a portion of a second embodiment of the apparatus.
Figure 9:
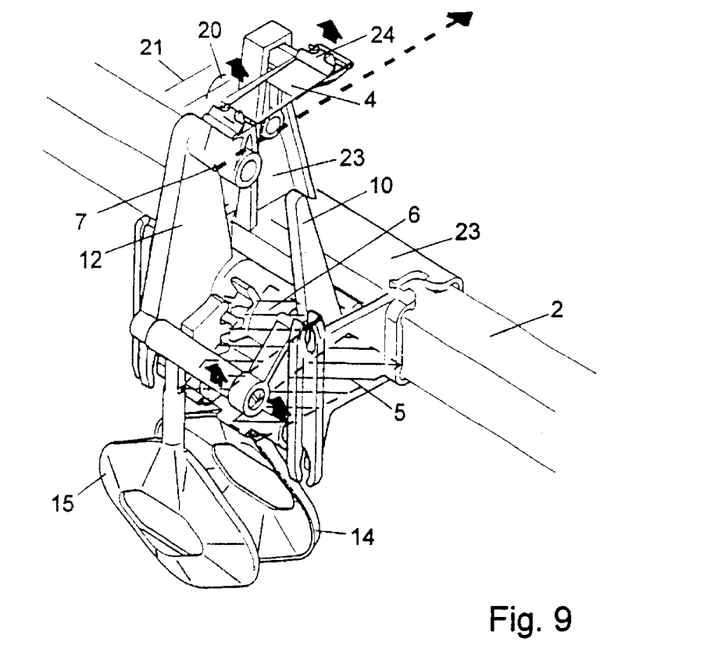
FIG. 9 shows a perspective view of a portion of the second embodiment of the apparatus.

The second embodiment of a weighing apparatus according to the invention comprises a second guide element 20 and a reference guide 21 over which the second guide element 20 moves, at least when the first guide element 7 moves over a said weighing surface 8. The gripper 1 is mounted on a crossbar 2 of the conveyor via a carrier member 23 adapted with respect to the first embodiment. A connection point 24 of the flexible member 4 which is located closest to the first guide element 7 and the carrier member 23 is displaceable in a direction perpendicular to the at least one weighing surface 8. The position of the displaceable connection point 24 is controlled by cooperation of the second guide element 20 and the reference guide 21, such that the flexible member 4 which is provided with the displaceable connection point 24 extends substantially parallel to the weighing surface 8 when the first guide element 7 moves over the weighing surface. To that end, the carrier member 23 comprises a coupling piece 22 which carries the second guide element 20 and the connection point 24. The coupling element 22 comprises a pin end 25 which is bearing-mounted in a slotted hole 26 in the carrier member 23 so as to be movable in vertical direction. The carrier member 23 further comprises a slotted opening 27 through which the guide element 20 reaches. These parts are clearly visible in FIG. 7. In FIGS. 8 and 9, the carrier member 23 and the gripper 1 are represented in side and perspective view, respectively, in assembled condition. In the present exemplary embodiment, only one flexible member 4 has a displaceable connection point 24. Needless to say, the other flexible members 5, 6 may also be provided with a movable connection point.

Figure 3:
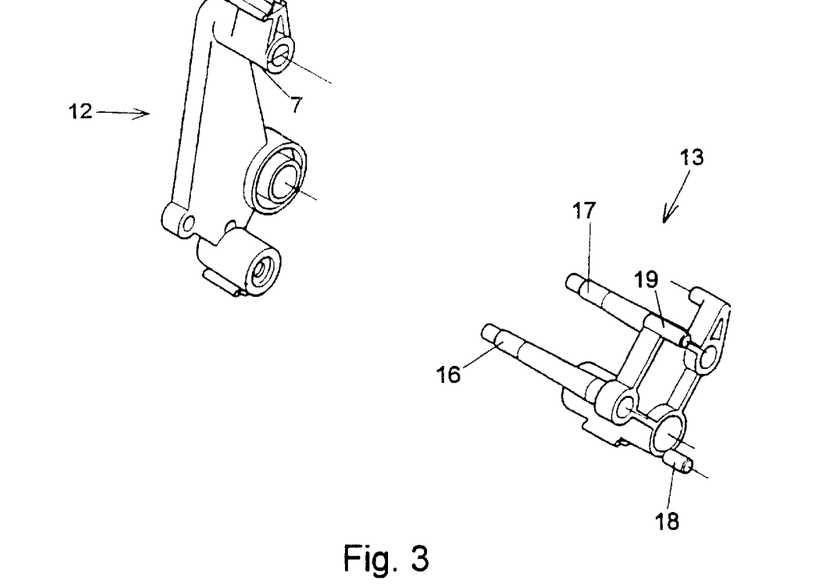
FIGS. 3 and 4 show perspective views of gripper parts.
Figure 4:
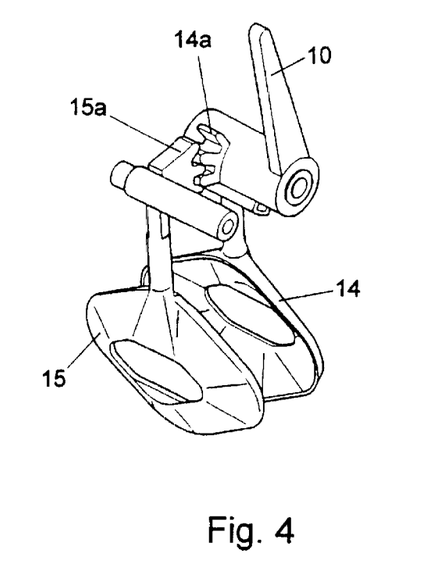
Figure 10:
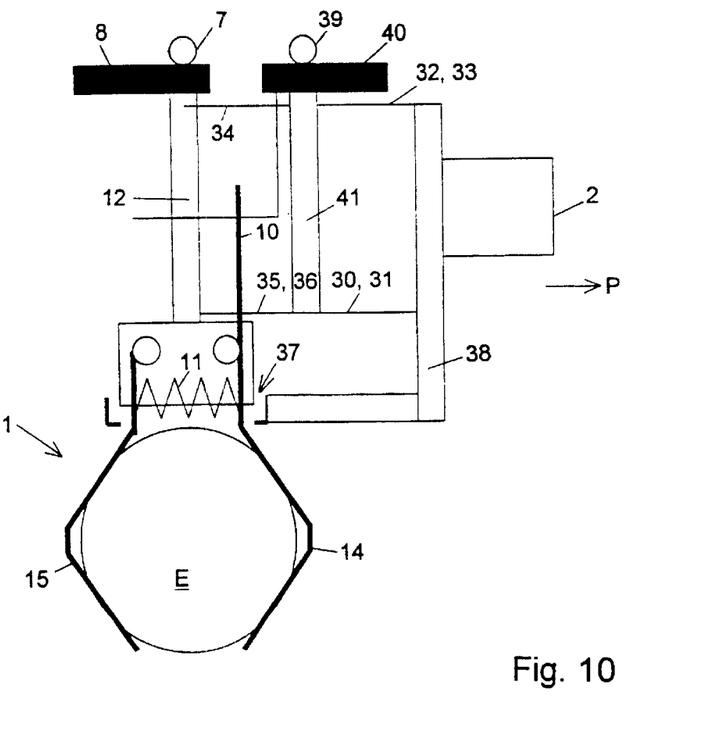
FIG. 10 shows a schematic outline of a portion of the third embodiment of the apparatus.

FIG. 10 shows a schematic side elevation of a third embodiment of the apparatus, in which the connection between the gripper 1 and the crossbars 2 of the conveyor comprises a first and a second assembly of flexible members 30, 31, 32, 33, and 34, 35, 36, respectively. The members 34–36 of the second assembly are flexible members having a very low spring constant. The members 30–33 of the first assembly are relatively stiff and each contain, for instance, only two bending points, enabling a kind of hinge movement. The gripper 1 is provided with two gripper parts 14, 15, a gripper lever 10, spring means 11 for biasing the gripper elements 14, 15 in the closed position, a body 12, a pin assembly 13 as represented in FIG. 3, and a first guide element 7 which is connected with the body 12 of the gripper 1. The gripper 1 rests via pins 18, 19 in a socket 37 of the carrier member 38 which is mounted on a crossbar 2 of the conveyor. The third embodiment further comprises a second guide element 39, which cooperates with a reference guide 40, at least when the first guide element 7 moves over a weighing surface 8. The second guide element 39 is mounted on an intermediate piece 41 which is connected on one side with the members 30, 31, 32, 33 of the first assembly and, on the other, with the flexible members 34, 35, 36 of the second assembly. For clarity, in FIG. 10, the flexible members 34, 35, 36 are shown on one side of the intermediate piece 41 and the members 30, 31, 32, 33 on the other side of the intermediate piece 41. In the practical exemplary embodiment of the third embodiment shown in FIGS. 11 and 13, the members 30, 31, 32, 33 have been turned over with respect to the design schematically represented in FIG. 10, so that the whole is of more compact design.

Figure 11:
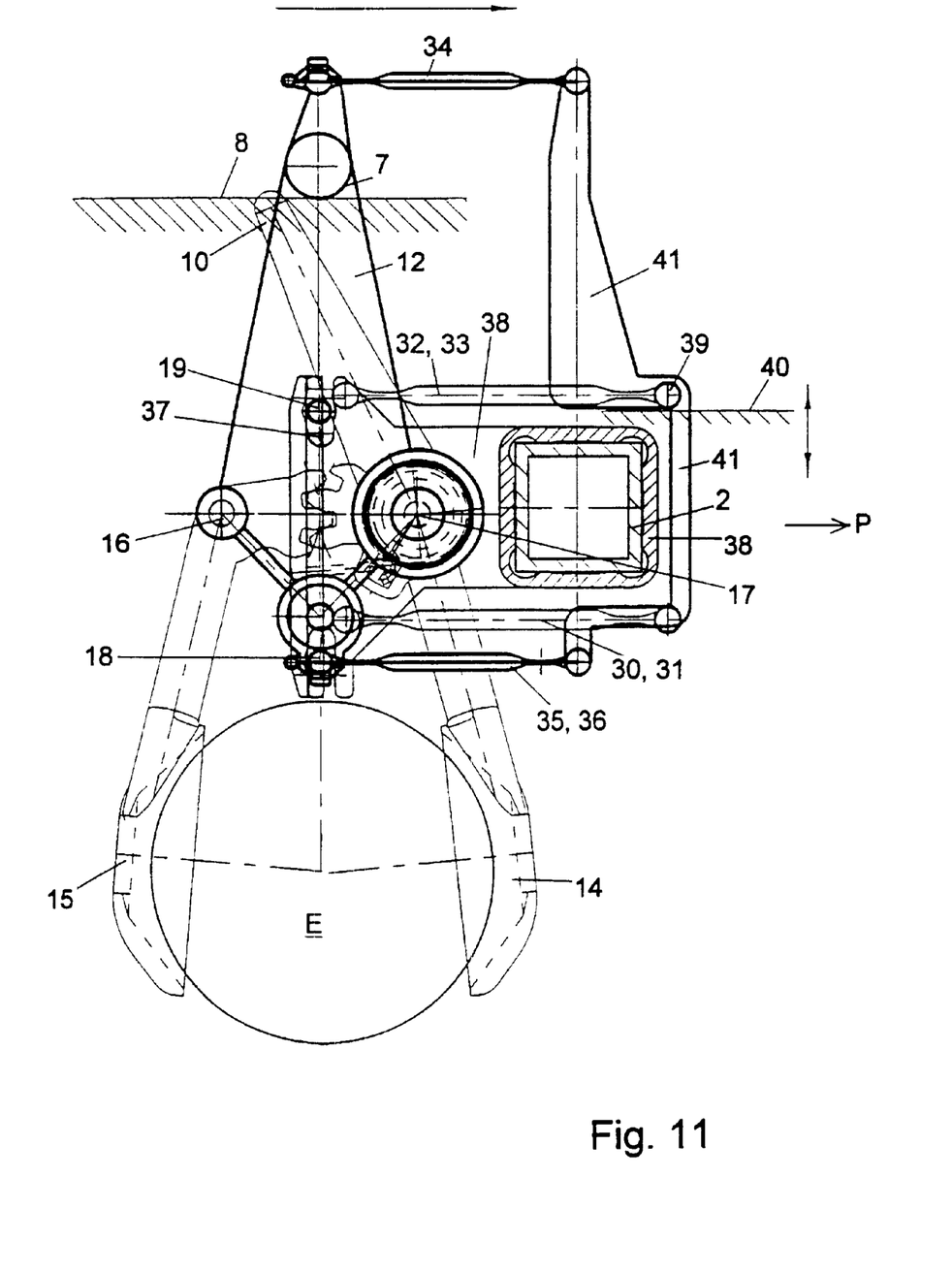
FIG. 11 shows a practical elaboration of the portion of the third embodiment represented in FIG. 10.
Figure 12:
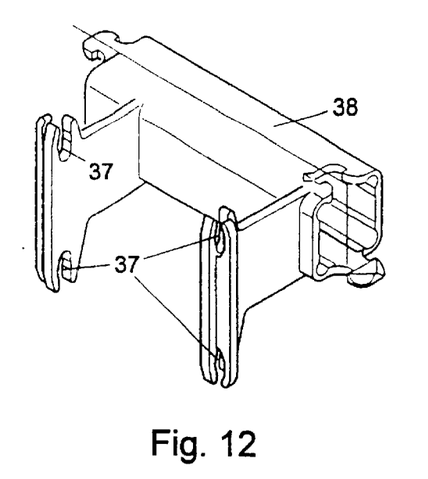
FIG. 12 shows a perspective view of the carrier member of the third embodiment.
Figure 13:
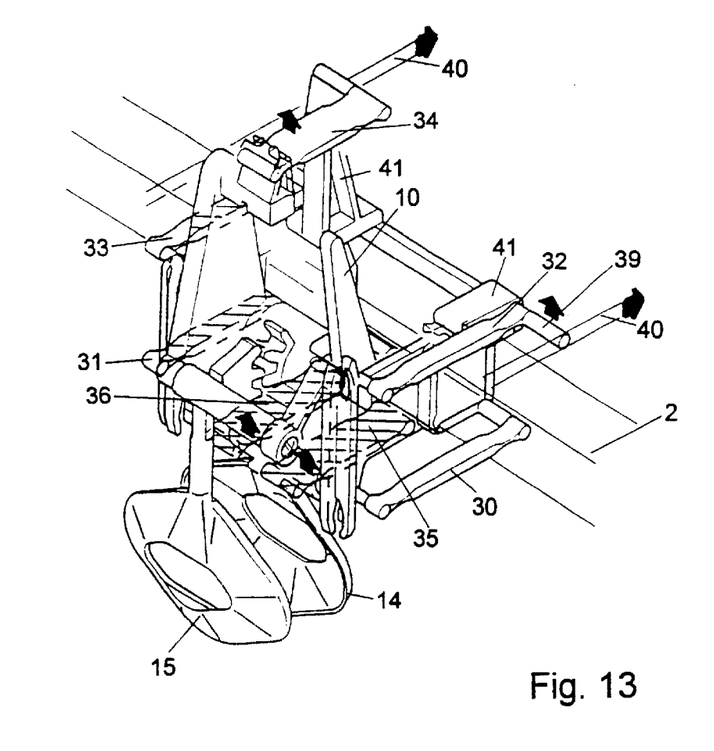
FIG. 13 shows a perspective view of a portion of the third embodiment.
Figure 15:
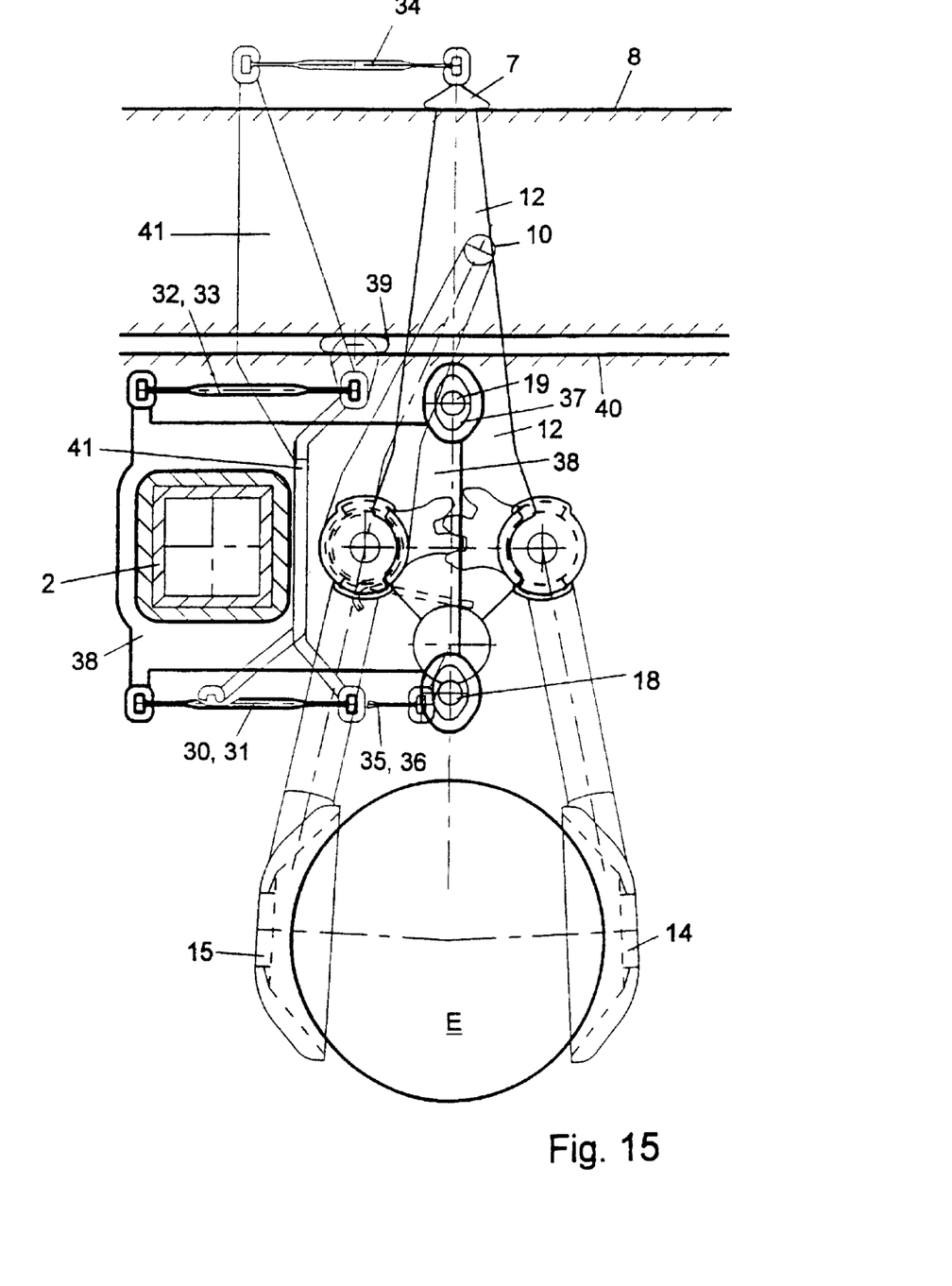
FIG. 15 shows a side view of a fourth exemplary embodiment of the apparatus.

FIG. 11 in particular shows clearly that the flexible members 30, 31, 32, 33 have their left-hand ends connected to the carrier member 38 and extend to the right. The right-hand ends of the flexible members 30, 31, 32, 33 are connected with the intermediate piece 41, which further carries the second guide element 39. The second guide element 39 cooperates with a reference guide 40. Extending to the left from the intermediate piece 41 are the flexible members 34, 35, 36 of the second assembly, which have their left-hand ends connected to the gripper 1. Vertical displacement of the crossbar 2 of the conveyor, which vertical. displacement may occur, for instance, through play in the conveyor or sagging of the bars 2, is fully compensated when the first guide element 7 moves over the weighing surface 8, in that the vertical position of the intermediate piece 41 is controlled by cooperation of the second guide element 39 with the reference guide 40. By virtue of the position of the reference guide 40 being, fixed with respect to the position of the weighing surface 8, the flexible members 34, 35, 36 of the second assembly extend perfectly parallel to the weighing surface 8 during weighing. The conveying force is thus prevented from transferring a vertical force component to the weighing surface 8. Needless to say, it must be possible for the flexible members 30, 31, 32, 33 to be subjected to a tensile load, since they are arranged downstream of the intermediate piece 41 and therefore sustain a pressure force from the carrier member 38 to overcome the frictional force which the first guide element 7 and the second guide element 39 sustain from the weighing surface 8 and the reference guide 40, respectively. The flexible members 34, 35, 36 of the second assembly are under strain of tension and can therefore be of highly flexible design. While FIGS. 11 and 13 show a practical embodiment of an apparatus where the members 30–33 of the first assembly are turned over with respect to the design represented schematically in FIG. 10, FIG. 15 shows an embodiment in which the intermediate piece 41 is so designed that the flexible members 34–36 of the second assembly are arranged between the members of the first assembly. By thus "compacting" the design represented schematically in FIG. 10, a particularly compact apparatus is obtained. It is noted that corresponding reference numerals in FIGS. 11 and 13 on the one hand and FIG. 15 on the other refer to corresponding parts.

Figure 14:
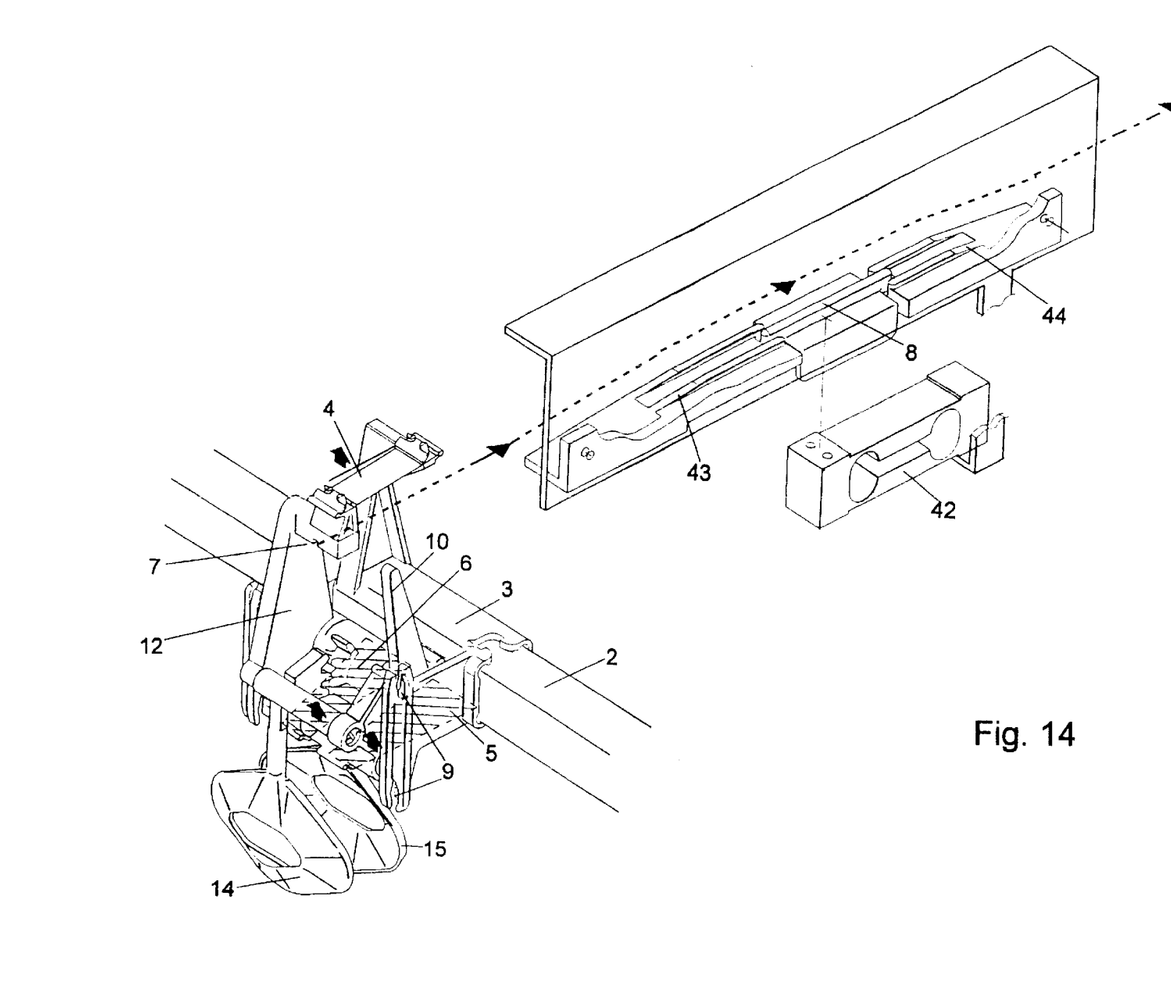
FIG. 14 shows a perspective view of a portion of the first embodiment of the apparatus, where the first guide element is on the point of moving over the weighing surface of a weighing element.

Finally, FIG. 14 shows again the embodiment represented in FIGS. 5 and 6 immediately prior to its moving onto the weighing surface 8 of a weighing element 42. It is clear that before the first guide element 7 rests on the weighing surface 8, the gripper 1 is lifted from the socket 9 via an ascending track 43. Thereupon, after the weighing surface 8 has been passed, the gripper 1 is gradually lowered via a descending track 44 back into the socket 9 of the carrier member 3. The ascending track 43 prevents the gripper 1, when it reaches the weighing surface 8, from going through a vertical motion, which vertical motion might adversely affect the accuracy of the measurement of the weighing element 42. In the exemplary embodiment shown in FIG. 14, the weighing element 42 is of single design, that is, for each row of grippers 1, which rows of grippers extend in the conveying direction of the conveyor, the weighing apparatus comprises one weighing element 42. Preferably, when one weighing element is opted for, this weighing element is designed as a weighing cell.

According to an alternative design, however, it is also possible to provide more weighing elements 42 per row of grippers 1. Thus, per row, for instance three weighing cells can be arranged, each provided with its own weighing surface 8. The weighing cells can be both of the damped and of the undamped type.

Preferably, the weighing apparatus comprises a processing unit which is connected to the or each weighing element 42 and which is arranged for deriving from the signal generated by the or each weighing element 42 a value related to the weight of the object E. Such a processing unit can be designed, for instance, as a computer which performs arithmetic and/or statistical operations on the measured signals in order to determine the value related to the weight of the object E.

Needless to say, the invention is not limited to the exemplary embodiments described, but various modifications within the purview of the invention are possible.

What is claimed is:

1. A weighing apparatus comprising a number of grippers, each designed for receiving therein an object to be weighed, each gripper being mounted on a conveyor via a hingeless connection, so that the grippers are arranged for movement along a gripper path, each gripper including a first guide element which, over at least a part of the gripper path, moves over a weighing surface of at least one weighing element, the weight of the gripper and the object located therein being transferred via the first guide element to the at least one weighing element, wherein the hingeless connection between each gripper and the conveyor comprises at least one assembly of flexible members, each having a particularly low spring constant in a direction perpendicular to the at least one weighing surface.

2. A weighing apparatus according to claim 1, wherein the first guide element and the or each weighing element are arranged above an object received in the subject gripper.

3. A weighing apparatus according to claim 1, wherein one assembly of flexible members are arranged relative to the first guide element such that these members, at least when the first guide element moves over a said weighing surface, are all subject to tensile loading.

4. A weighing apparatus according to claim 1, including a second guide element and a reference guide over which the second guide element moves, at least when the first guide element moves over a said weighing surface, while a connection point between the conveyor and at least the flexible member located closest to the first guide element is displaceable in a direction perpendicular to the at least one weighing surface, the position of the displaceable connection point being controlled by cooperation of the second guide element and the reference guide, such that at least the or each flexile member provided with a displaceable connection point extends substantially parallel to the at least one weighing surface when the first guide element moves over a said weighing surface.

5. A weighing apparatus according to claim 1, wherein the connection between each gripper and the conveyor comprises a first and a second assembly of members, the weighing apparatus comprising a second guide element and a reference guide over which the second guide element moves, at least when the first guide element moves over a said weighing surface, the first assembly forming a connection between the second guide element and the conveyor, the second assembly forming a connection between the second guide element and the gripper, the members of the second assembly being flexible members each having a particularly low spring constant in a direction perpendicular to the weighing surface, the first and the second guide element and the at least one weighing surface and the reference guide being arranged relative to each other such that the flexible members of the second assembly extend substantially parallel to the at least one weighing surface when the first guide element moves over a said weighing surface.

6. A weighing apparatus according to claim 5, wherein the members of the first assembly are designed as flexible members having a particularly low spring constant in a direction perpendicular to the weighing surface.

7. A weighing apparatus according to claim 5, wherein the members of the first assembly are designed as rods having their ends pivotally connected to, on the one hand, the conveyor and, on the other, an intermediate piece which carries the second guide element.

8. A weighing apparatus according to claim 1, wherein the flexible members are flexible strips having a particularly high flexibility.

9. A weighing apparatus according to claim 1, wherein the flexible members are leaf springs.

10. A weighing apparatus according to claim 1, wherein each gripper, when the first guide element associated with the subject gripper does not move over the weighing surface, rests in a socket which is fixedly connected with the conveyor so that the load on the or each flexible member is removed.

11. A weighing apparatus according to claim 10, wherein each gripper comprises an operating lever and spring means, which spring means are biased to keep the gripper in a closed position, while, using the operating lever, the gripper can be opened against the spring force of the spring means, the socket in which a subject gripper rests being so designed so as to take up the reactive forces occurring upon operation of the operating lever.

12. A weighing apparatus according to claim 1, including a number of rows of grippers, which rows extend in a direction of transport, the apparatus comprising for each row of grippers at least one weighing element, designed as a weighing cell, comprising one weighing surface.

13. A weighing apparatus according to claim 12, including a number of rows of grippers, which rows extend in a direction of transport, the apparatus comprising for each row of grippers three weighing elements, designed as weighing cells, each comprising a weighing surface.

14. A weighing apparatus according to claim 1, including a processing unit which is connected to the or each weighing element and which is arranged for deriving from the signal generated by the or each weighing element a value related to the weight of the object.

* * * * *